United States Patent [19]

Epworth et al.

[11] 4,149,771
[45] Apr. 17, 1979

[54] OPTICAL FIBER CONNECTOR

[75] Inventors: Richard E. Epworth; John S. Leach, both of Bishops Stortford, England

[73] Assignee: International Standard Electric Corporation, New York, N.Y.

[21] Appl. No.: 841,792

[22] Filed: Oct. 13, 1977

[30] Foreign Application Priority Data

Oct. 14, 1976 [GB] United Kingdom ............... 42720/76

[51] Int. Cl.² .............................................. G02B 5/14
[52] U.S. Cl. .............................................. 350/96.21
[58] Field of Search .......................... 350/96.21, 96.22; 339/260; 267/155, 166, 180

[56] References Cited

U.S. PATENT DOCUMENTS

| 1,634,065 | 6/1927 | Barany ................................. 339/260 |
| 3,961,835 | 6/1976 | Huang et al. ....................... 339/260 |
| 4,087,157 | 5/1978 | Hodges ............................. 350/96.21 |

FOREIGN PATENT DOCUMENTS 2531857  2/1976  Fed. Rep. of Germany ........ 350/96.21

*Primary Examiner*—Rolf G. Hille
*Attorney, Agent, or Firm*—T. L. Peterson

[57] ABSTRACT

A spiral spring strip for coupling a pair of optical fibers which may be terminated with ferrules. The spring loop diameter is reduced by tension so as to grip the ferrules. Several spirals may be employed to form a multiway connector.

10 Claims, 6 Drawing Figures

OPTICAL FIBER CONNECTOR

BACKGROUND OF THE INVENTION

This invention relates to optical fiber connectors and splices and, in particular, to connectors and splices in which optical fibers are held with their cores in aligned butting relationship.

In order to achieve the efficient transfer of light from the end of one optical fiber into the end of another butted against the first it is necessary to bring the fiber cores into substantial alignment. This may be effected by providing the two fiber ends with reference surfaces whose position relative to the respective fiber cores is accurately known. Alignment of the cores is then effected by bringing these reference surfaces into appropriate alignment.

This invention is concerned with the use of cylindrical reference surfaces centered on the fiber cores. The reference surface that is used may be the surface of the fiber cladding or it may be the surface of a ferrule-type termination secured to the fiber in the region of its end.

Copending application of R. J. Hodges, Ser. No. 730,606, filed Oct. 7, 1976, now U.S. Pat. No. 4,087,157, assigned to the assignee of the present application, describes a permanent or demountable butt joint between the ends of a pair of optical fibers which, in the regions of their ends to be butt jointed, are provided with cylindrical reference surfaces of equal diameter each of which is coaxial with its associated fiber core. The fibers are held butted together in alignment by a close wound helix of strip material engaged around and gripping the two reference surfaces.

SUMMARY OF THE INVENTION

According to one aspect of the present invention, there is provided a coupling element for butt coupling a pair of terminated or unterminated optical fibers. The coupling element including a strip of spring material having a longitudinally extending tongue portion threaded through a cut-out in the strip so as to form a loop. The loop is prestressed inwardly so as to receive and grip the fiber terminations or fiber ends in a butting relationship.

According to a further aspect of the invention there is provided an optical fiber connector having a plurality of spiral springs, each for receiving a pair of fibers to be coupled. The connector includes at least one spring mounting means. Each spiral spring is carried by the mounting means. The mounting means and the springs are so arranged that movement of the mounting in different directions relative to the spiral springs opens or closes the loops of the spiral springs, depending upon the direction of movement, so as to release or secure pairs of terminated or unterminated optical fibers placed end-to-end in the loops.

DESCRIPTION OF THE PREFERRED EMBODIMENTS

Figure 1:
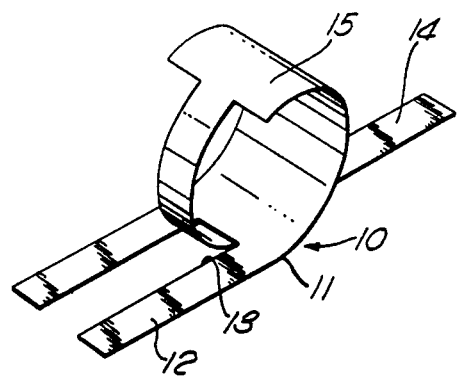
FIG. 1 shows a spiral spring connector element according to the invention.
Figure 2:
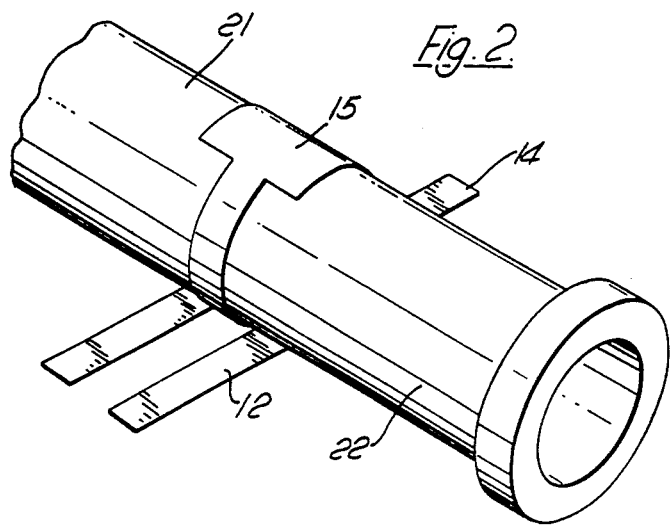
FIG. 2 shows the spring of FIG. 1 coupling a pair of optical fiber ferrules.

Referring to FIG. 1, the coupling element 10 includes a strip 11 of spring material which may be formed from phosphor bronze or berylium copper. One end 12 of the strip 11 has a cut-out 13 through which a tongue 14 at the other end of the strip 12 is threaded when the strip is rolled, e.g. around a mandrel. As shown in FIG. 2, the loop 15 formed by the coupling element 10 receives a pair of optical fiber carrying ferrules 21 and 22 in end butting relationship. Tension may then be applied to the tongue 14 and end 12 of the spring strip to close the loop securely onto the ferrules 21 and 22 so as to hold them in axial alignment. In some applications the spring loop 15 may be pre-set with a diameter smaller than that of the ferrules, the spring then being opened out to receive the ferrules. On release the spring tension closes the loop to grip the pair of ferrules.

Figure 3A:
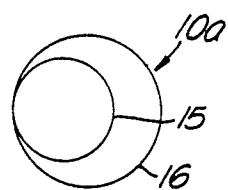
FIGS. 3a and 3b schematically show two forms of closed loop spring connector elements.
Figure 3B:
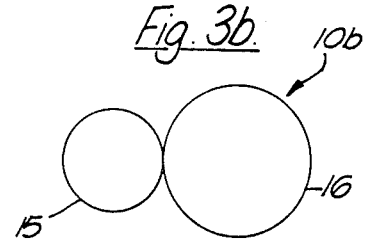

Alternative types of spring coupling elements 10a and 10b are shown in FIGS. 3a and 3b, respectively, and are formed from the spring of FIG. 1 by welding the end 12 and tongue 14 together to form a closed loop 16.

Figure 4:
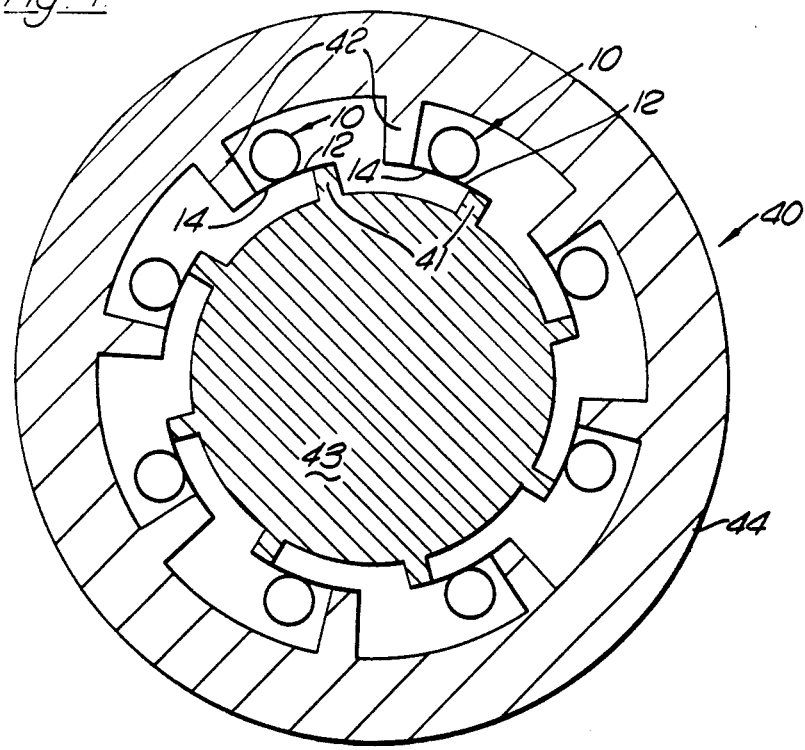
FIG. 4 is a cross-section of a multiway optical connector according to the invention.

FIG. 4 shows the coupling element 10 of FIG. 1 applied to a multiway optical fiber connector 40. The spring coupling elements 10 are arranged with their ends 12 and 14 secured to the teeth 41 and 42 of relatively rotatable members 43 and 44, respectively. Relative rotation of the members 43 and 44 closes the springs to clamp ferrules inserted therein, or opens the springs to release the ferrules.

Figure 5:
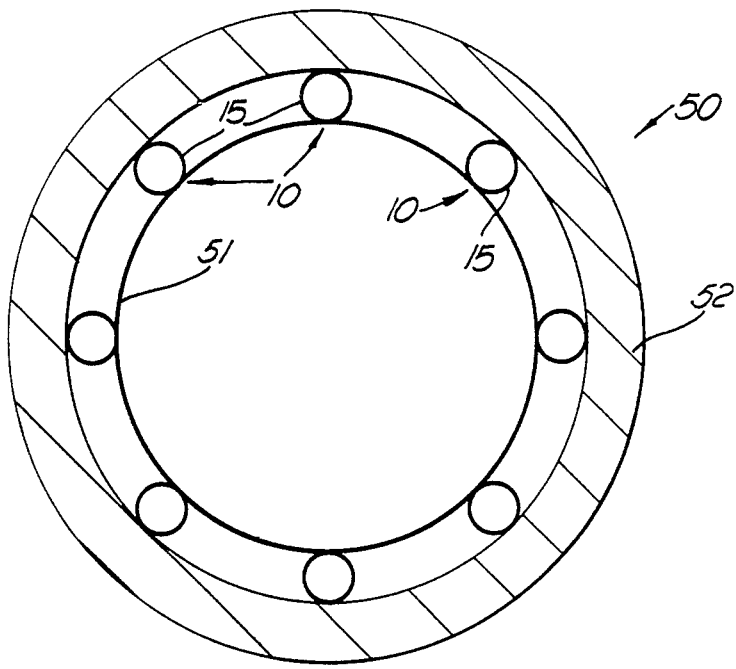

FIG. 5 shows a further type of connector 50 employing an array of spring members 10 with their ends 12 and 14 welded together so as to form a circle 51. The arrangement is inserted into a taper collet 52. The spring loops 15 are set so that, when relaxed, they grip pairs of ferrules inserted therein. Forcing the circle 51 into the taper collet 52 reduces the circle diameter and opens out the spring loops so as to release the ferrules.

Figure 6:
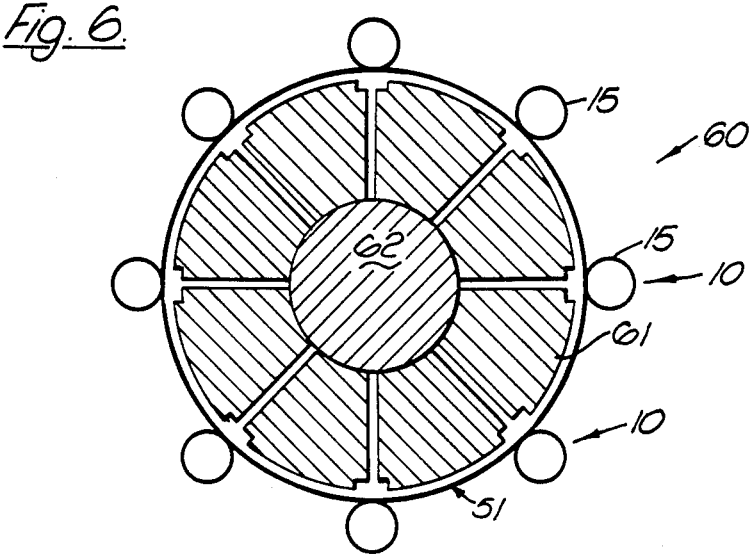
FIGS. 5 and 6 are cross-sections of further types of multiway connectors.

FIG. 6 shows a modification 60 of the connector of FIG. 5 in which a circle 51 of spring loop members 10 is fitted over a ring of chuck jaws 61. Insertion of a taper pin 62 into the center of the chuck jaws forces the jaws apart thus expanding the circle 51 and closing the spring loops 15.

Figure 7:
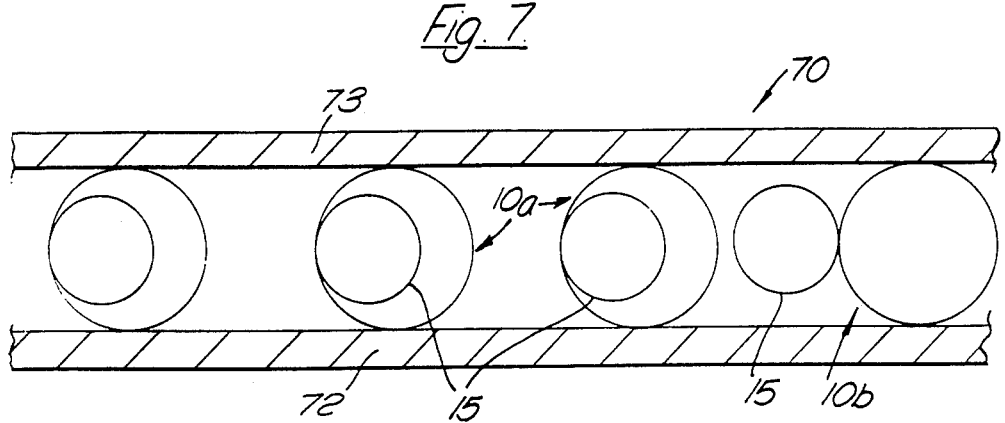
FIG. 7 is a cross-section of a linear multiway optical connector.

FIG. 7 shows a linear multiway connector 70. Spring loop members 10a or 10b of the type of FIG. 3a or FIG. 3b are mounted between a pair of parallel, flat plate members 72 and 73. Pressure on the plate members opens the ferrule receiving loops 15.

Although the coupling arrangements described herein are primarily intended for use with ferrule terminated fibers, in some applications the spring loops 15 may be made sufficiently small to receive the bared fiber ends. It should also be understood that, although the coupled fibers are described as being in butting relationship, a very small gap is, in fact, provided between the fibers to prevent mutual abrasion and damage of the fiber ends. This gap is too small to significantly affect the transmission qualities of the coupling but avoids damage to the fiber ends caused by abrasion.

What is claimed is:

1. A coupling element for butt coupling a pair of terminated or unterminated optical fibers comprising:

a strip of spring material having a longitudinally extending tongue portion at one end thereof and a cut-out in the other end thereof;

said tongue portion being threaded through said cut-out in said strip so as to form a first loop;

said first loop being prestressed inwardly so as to receive and grip the fiber terminations or fiber ends in a butting relationship; and the end of said tongue portion and other end of said strip being joined to provide a second loop of a diameter greater than that of said first loop, whereby compression of said second loop opens said first loop to release its grip upon the fiber terminations or fiber ends.

2. An optical fiber connector for butt coupling terminated or unterminated optical fibers comprising:

a plurality of spiral springs each having a loop for receiving a pair of fibers to be coupled;

at least one spring mounting means;

said spiral springs being carried by said mounting means; and said mounting means and said springs being so arranged that movement of said mounting means in different directions relative to said spiral springs opens or closes said loops of said spiral springs, depending upon the direction of movement, so as to release or secure a pair of optical fibers placed end-to-end in said loops.

3. An optical fiber connector as set forth in claim 2 wherein:

said spiral springs are formed integral with a substantially circular spring.

4. An optical fiber connector as set forth in claim 3 wherein:

said mounting means comprises taper collet surrounding said spiral springs and circular spring for increasing and decreasing the diameter of said circular spring so as to grip and release fibers placed end-to-end in said spiral spring loops.

5. An optical fiber connector as set forth in claim 3 wherein:

said mounting means comprises chuck jaw means inside said circular spring for increasing and decreasing the diameter of said circular spring.

6. An optical fiber connector as set forth in claim 2 wherein:

said mounting means includes first and second plane surfaces movable toward and away from each other; and said spiral springs are mounted between said first and second movable plane surfaces.

7. An optical fiber connector as set forth in claim 2 wherein:

said mounting means comprises inner and outer relatively rotatable members; and one end of each spiral spring is connected to said inner member and the other end of each spiral spring is connected to said outer member.

8. A coupling element as set forth in claim 1 wherein:
said second loop surrounds said first loop.

9. A coupling element as set forth in claim 1 wherein:
said second loop is adjacent to said first loop to form a figure 8.

10. A coupling element as set forth in claim 1 including:

means for compressing said second loop to open said first loop.

* * * * *